May 14, 1957     K. G. OPPENHEIMER     2,791,950
GAUGE DEVICE FOR CAMERA EQUIPMENT

Filed Sept. 17, 1954     2 Sheets-Sheet 1

INVENTOR.
Kenneth G. Oppenheimer
BY
McMorrow, Berman & Davidson

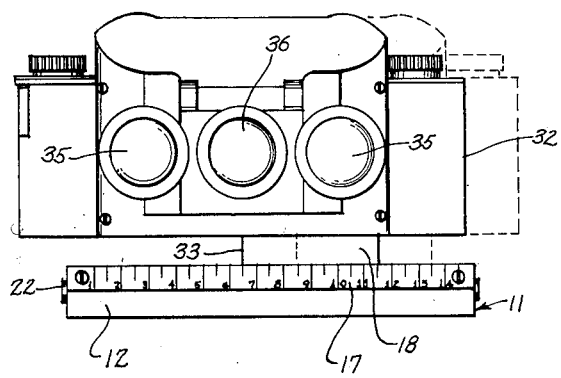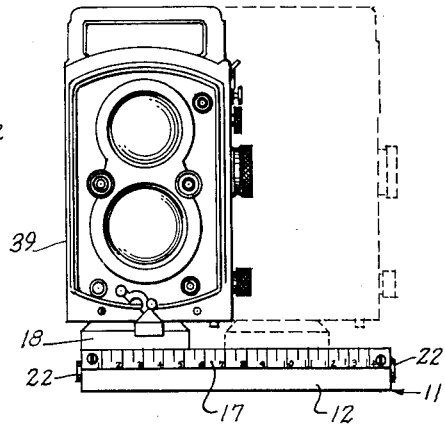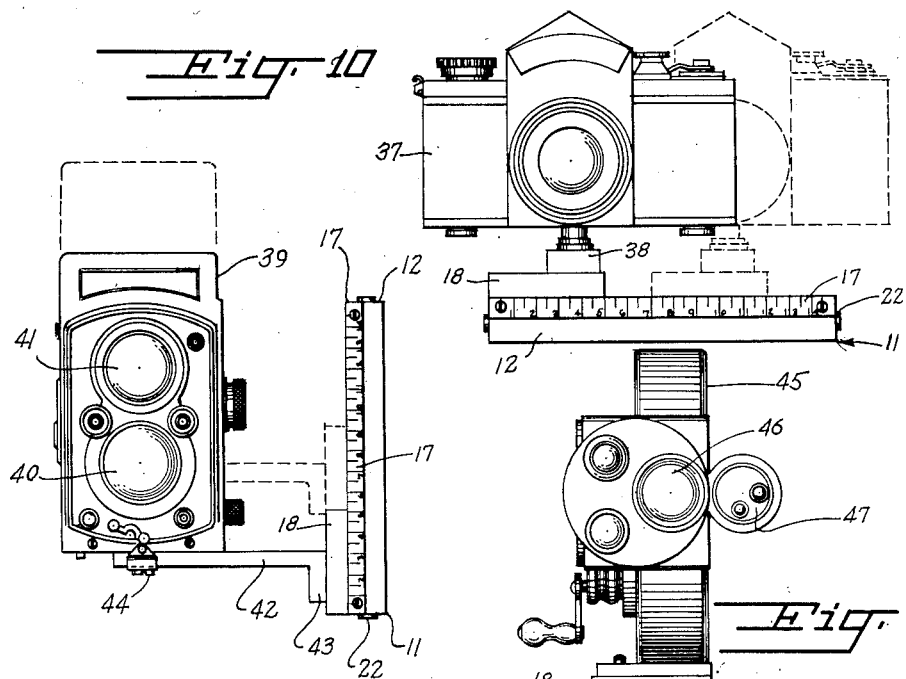

United States Patent Office 2,791,950
Patented May 14, 1957

2,791,950

GAUGE DEVICE FOR CAMERA EQUIPMENT

Kenneth G. Oppenheimer, Los Angeles, Calif.

Application September 17, 1954, Serial No. 456,686

1 Claim. (Cl. 95—86)

This invention relates to photographic equipment, and more particularly to an improved gauge device for use with camera equipment.

A main object of the invention is to provide a novel and improved accurately adjustable mounting for camera equipment especially suitable for use with stereoscopic cameras for adjusting the interocular distances between the lenses of the cameras, as in taking "close-up" pictures, for use with stereoscopic cameras for "hyper-stereo" pictures, for taking stereoscopic pictures with ordinary 35 mm. or reflex cameras, and the like, for making parallax adjustments for twin lens reflex cameras, for use as a shift-over alignment gauge for shifting the position of the camera lens to the original position of the view finder of the camera, as required in taking "close-up" pictures, for focusing adjustments for "closeups" and movie titles, when employed with a movie camera, and for similar photographic operations.

A further object of the invention is to provide an improved accurately adjustable mounting gauge device for use with camera equipment, said device being simple in construction, being easy to operate, being usable with a wide range of cameras, both still and movie cameras, being relatively compact in size, and being durable in construction.

Further objects and advantages of the invention will become apparent from the following description and claim, and from the accompanying drawings, wherein:

Figure 7 is a front elevational view showing a conventional stereoscopic camera mounted on the gauge device of Figures 1 to 6;

Figure 8 is a front elevational view showing a conventional twin lens reflex camera mounted on the gauge device of Figurese 1 to 6;

Figure 9 is a front elevational view showing a gauge device such as that illustrated in Figures 1 to 6, employed with a twin lens reflex camera for the purpose of providing a parallax adjustment to compensate for the distance between the camera lens and view finder lens, as required for close-up photography;

Figure 10 is a front elevational view showing the gauge device of Figures 1 to 6 employed with a conventional 35 mm. camera to enable the camera to take stereoscopic pictures; and Figure 11 is a front elevational view showing the gauge device of Figures 1 to 6 employed with a movie camera to obtain accurate focusing adjustments, as when making close-up pictures and photographing movie titles.

Figures 1, 2:
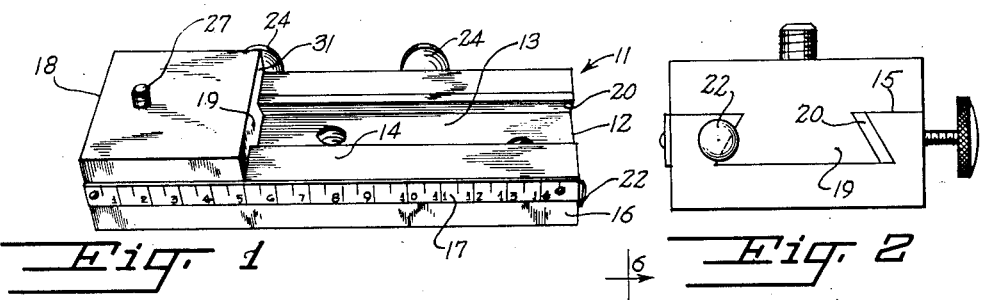
Figure 1 is a perspective view of an improved alignment gauge device constructed in accordance with the present invention.
Figure 2 is an enlarged end elevational view of the alignment device of Figure 1.

Referring to the drawings, the improved gauge device is designated generally at 11 and comprises a bed plate 12 which is generally rectangular in shape and which is formed with a longitudinal dovetail groove 13 defining a pair of longitudinal sliding surfaces 14, 15 on the top of the plate 12 at the opposite sides of the dovetail groove 13. The front edge 16 of the bed plate 12, as viewed in Figure 1, has secured thereto the longitudinally extending scale strip 17 which is marked off in suitable units, such as in centimeters and fractions thereof, as shown.

Designated at 18 is a camera platform which is slidably mounted on the bed plate 12, the platform 18 being formed with the dovetail rib 19 which is received in the dovetail groove 13, the respective undersides of the camera platform 18 being slidably supported on the respective longitudinal surfaces 14 and 15 of the bed plate.

A longitudinally extending gib plate 20 is disposed between one side of the dovetail rib 19 and the rear wall of the dovetail groove 13, namely, the wall adjacent the rear longitudinal surface 15.

Figures 5, 6:
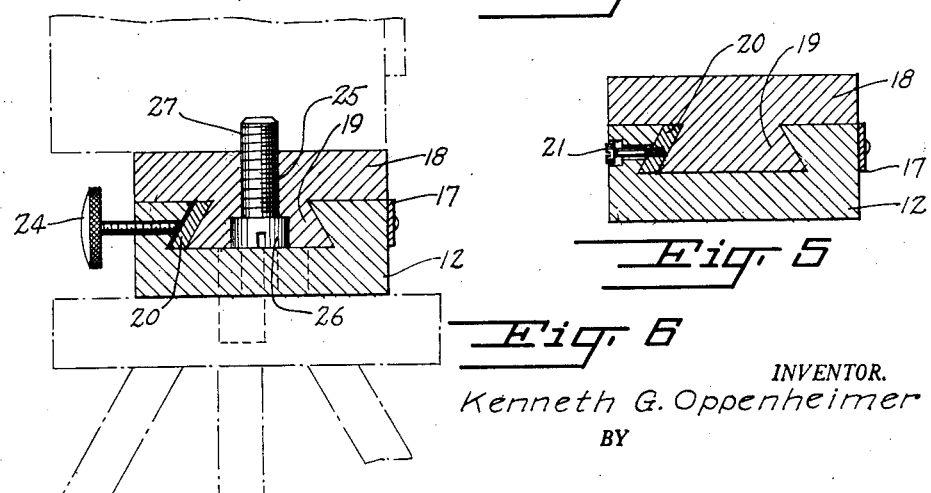
Figure 5 is a transverse vertical cross sectional view taken through the gauge device on line 5—5 of Figure 3.
Figure 6 is a transverse vertical cross sectional view taken on line 6—6 of Figure 3.

The respective end portions of the gib plate 20 are loosely secured in the dovetail groove 13 by respective retaining screws 21, 21 in the manner shown in Figure 5, whereby the gib plate 20 is held against substantial longitudinal movement in the dovetail groove 13.

Designated at 22, 22 are respective headed retaining studs which are threadedly engaged in the opposite ends of the bed plate 12, the heads of the studs 22 extending over the ends of the dovetail groove 13 and defining stop means for preventing the camera platform 18 from becoming disengaged from the bed plate 12. However, should it be necessary to remove the platform 18, as when it is desired to reverse the position thereof, one of the studs 22 may be removed, allowing the platform to be disengaged from the dovetail groove 13.

Designated at 24, 24 are respective clamping screws which are threadably engaged through the side wall of the bed plate 12 and which are engageable with the gib plate 20, said gib plate being sufficiently movable inwardly so that when one of the clamping screws 24 is advanced inwardly, the gib plate is forced against the adjacent dovetail rib 19 of the camera platform 18 to rigidly secure said camera platform against movement on the bed plate 12.

The camera platform 18 is formed with the vertical aperture 25, said aperture being counterbored at 26. Rotatably received in the aperture 25 and counter bore 26 is an inverted camera mounting screw 27 which may be engaged with the tripod socket of a camera to be supported on the platform 18. The bottom wall of the dovetail groove 13 is formed adjacent its opposite ends with the respective internally threaded vertical apertures 28, 28 which are registrable with the camera mounting screw 27, whereby a screwdriver may be engaged through an aperture 28 to engage the head of the screw 27, and whereby said screw 27 may be rotated to engage with the tripod socket of the camera when it is desired to fasten the camera to the platform 18. The apertures 28 are located so that they will be in registry with the camera mounting screw 27 when the platform 18 is in abutment with the head of a retaining stud 22 with the mounting platform 18 in either one of its two possible positions on the bed plate 12. Thus, with the mounting carriage 18 in position shown in Figure 1, the screw 27 will be registrable with the left-hand aperture 28. If the platform 18 is in a reversed position, the mounting screw 27 will be registrable with the right-hand aperture 28.

The bottom wall of the dovetail groove 13 is formed at the mid portion thereof, namely, midway between the opposite ends of the bed plate 12, with the respective threaded apertures 29 and 30 engageable with the respective fastening screws of conventional tripods, for example, engageable with the fastening screws of American and European tripod heads.

Figure 3:
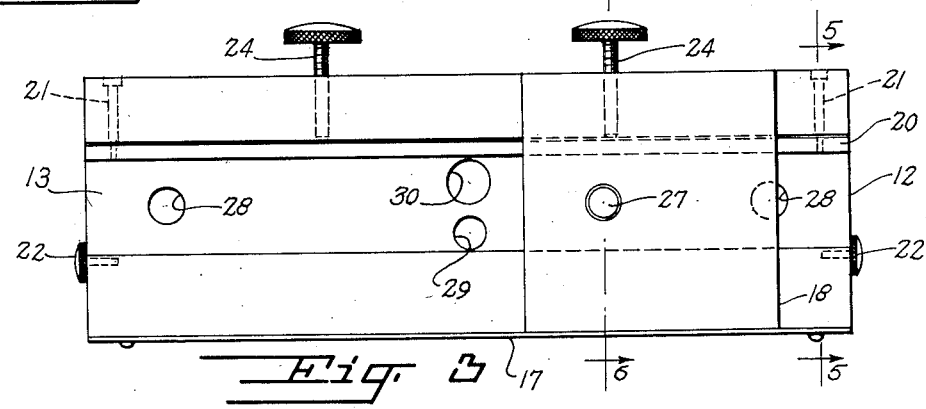
Figure 3 is an enlarged top plan view of the gauge device of Figure 1.
Figure 4:
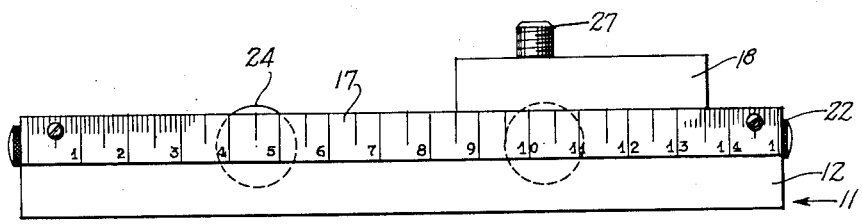
Figure 4 is a front elevational view of the gauge device of Figure 1.

As shown in Figure 3, the clamping screws 24, 24 are spaced symmetrically on opposite sides of the transverse center linge of the bed plate 12, whereby the clamping screws 24 may be employed to lock the camera supporting platform 18 in corresponding positions spaced on opposite sides of said transverse center line.

In a preferred embodiment of the invention, the center of the mounting screw 27 is exactly 35 mm., or one-half of the interocular distance of 70 mm., from the right edge 31 of the camera supporting platform 18, as viewed in Figure 1.

The device may be employed to vary the interocular distance usually provided by a stereoscopic camera, for example, the stereoscopic camera 32 shown in Figure 7. This may be required in order to take close-up pictures at a distance less than the distance of about two and one-half feet provided by the conventional stereoscopic camera focus arrangement.

Such extreme close-up photography requires a shorter interocular distance than the 70 mm. interocular distance provided by the conventional camera. These shorter interocular distances can be obtained from tables presently available and are provided in relation to the distance of the subject to the lens as well as to the auxiliary lenses which may be employed on the camera for close-up stereoscopic work. For example, assume that an interocular distance of 50 mm. is required for a given stereoscopic picture. It is also assumed that the camera 32 is mounted in the manner shown in Figure 7, namely, so that the back of the camera is on the same side as the clamping screws 24, 24 and that the lenses face on the same side as the scale 17. The left edge of the camera supporting platform 18, as viewed in Figure 7, namely, the edge 33, which is aligned with the lens of the view finder 36 of the camera and which is centered between the camera lenses 35, 35, is first set at the center of the scale 17, namely, at the 7.5 mm. position. The picture desired is then focused and adjusted. The left lens is then covered and the platform 18 is moved to the left, as viewed in Figure 7, for a distance corresponding to one-half the difference between 70 mm. and the desired interocular distance of 50 mm., namely, 10 mm., placing the left edge 33 of the platform at the 6.5 mm. marking on scale 17. This position is shown in Figure 7. The exposure is then made with the right lens 35. The left lens is then uncovered and the right lens is covered and the platform 18 is then moved to the right, as viewed in Figure 7, so that the edge 33 is moved 10 mm. to the right of the center mark, namely, to the 8.5 mm. mark on scale 17, as shown in dotted view in Figure 7. The exposure is then made with the left lens without advancing the film, thus providing a pair of stereoscopic exposures having an interocular distance of 50 mm.

A procedure reverse to that above described may be employed to obtain "hyper-stereoscopic pictures" with interocular distances up to the order of six inches.

The gauge device may be employed with a conventional 35 mm. camera, such as the camera 37 in Figure 10 for stereoscopic photography, namely, to enable two pictures to be taken at a desired interocular distance. Thus, the camera 37 may be mounted on the platform 18 and a picture may be taken in a first position, such as that shown in full line view in Figure 10, the film may be advanced, and a next picture may be taken with the platform 18 moved to the dotted view position, as shown in Figure 10, namely, for a distance corresponding to the desired interocular distance along the scale 17, in which position the next picture may be taken. For maximum accuracy, the camera should be first positioned so that the lens is over the center of the scale 17, in which position the picture focused and adjusted; the camera is then moved one-half the desired interocular distance to the left along the scale 17, the first exposure is then made, after which the film is advanced and the camera is moved to the right for the desired interocular distance along the scale 17, after which the second picture is taken.

The camera 37 may be mounted directly on the platform 18, or may be mounted on a suitable block member or bracket 38 engaged with the camera tripod socket and suitably engaged by the fastening screw 27, as shown in Figure 10, whereby the camera is secured on and supported by the platform 18.

Figure 8 illustrates the device employed with a reflex camera 39, said reflex camera being employed in the same manner as the 35 mm. camera 37, for obtaining stereoscopic exposures by means of the gauge device. Thus, a first exposure may be taken with the camera in the full line position shown in Figure 8, after which the film is advanced, and a second picture may be taken with the camera in the dotted view position of Figure 8, namely, in a position spaced the desired interocular distance with respect to the first picture. The gauge device 11 may be employed for making parallax adjustments for twin lens reflex cameras, such as cameras similar to the camera 39 in Figure 9. The camera 39 is provided with the camera lens 40 and the view finder lens 41. For making this adjustment, the camera 39 must be mounted so that the axis joining the centers of the lenses 40 and 41 is parallel to the bed plate 12 of the alignment gauge 11. For this purpose, a bracket member 42 is provided, said bracket member having a base portion 43 which is secured to the platform 18 by means of the fastening screw 27. The bracket member 42 is then employed to support the camera 39 by means of a suitable screw 44 extending through an aperture in the end of the bracket member and engaging the tripod socket of the camera. The camera may be focused by means of the view finder lens 41, after which, the camera is moved upwardly from the full line position shown in Figure 9 to the dotted view position thereof for a distance along the scale 17 corresponding to the distance between the lenses 40 and 41, after which the picture may be taken. Thus, parallax is completely eliminated on extreme close-ups and other work requiring a high degree of precision.

Figure 11 illustrates the manner in which the device is employed as a shift-over alignment gauge which may be used with a still camera or with a movie camera, such as the movie camera 45 shown in Figure 11, for close-up work, or other work requiring a high degree of precision, to compensate for the distance between the camera lens and the view finder of the camera, for example, the distance between the camera lens 46 and the view finder 47 of the camera 45 shown in Figure 11. Thus, when employed with a movie camera, the device may be used for accurate focusing adjustments when making close-ups, and when photographing movie titles.

While a specific embodiment of an improved alignment gauge for use with camera equipment has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A gauge device for camera equipment comprising a bed plate having a longitudinal sliding surface, said bed plate being formed with a longitudinal dovetail groove, a longitudinal scale on said bed plate, a camera platform slidably mounted on said bed plate, said platform having a dovetail extension slidably fitting said groove, respective stop screws engaged in the opposite ends of said bed plate and having heads extending over the ends of said groove, to limit sliding movement of said platform, said platform being formed with a vertical aperture having a counterbore at its bottom, an upstanding screw in said aperture, said screw having a head disposed in said counterbore, whereby the screw is retained in said aperture with its head engaged by said counterbore and slidably engaging the bottom of said dovetail groove, said screw being formed for threaded engagement with a camera, the bottom wall of said dovetail groove being formed with an aperture which at a certain position of the platform registers with the upstanding screw to provide access to the head of the screw, a gib plate disposed between a wall of said bed plate and said dovetail extension, retaining means secured to the opposite end portions of said gib plate and extending loosely through said wall, and screw means threaded through said wall intermediate said retaining means and being engageable with the intermediate portion of said gib plate to clampingly secure said platform at a selected position along said groove, said plate being formed at its mid portion with a plurality of transversely aligned threaded apertures of different diameters to receive respective tripod fastening screws of different sizes, for securing said bed plate to a tripod.

References Cited in the file of this patent

UNITED STATES PATENTS

| | | |
|---|---|---|
| 1,408,654 | Stilwell | Mar. 7, 1922 |
| 1,971,486 | Jennings | Aug. 28, 1934 |
| 2,351,386 | Zucker | June 13, 1944 |
| 2,521,820 | Beardsley | Sept. 12, 1950 |